United States Patent [19]
Ehrlich

[11] Patent Number: 6,116,274
[45] Date of Patent: Sep. 12, 2000

[54] SIGHT GLASS WITH CHECK VALVE AND FILTER

[75] Inventor: Stephen J. Ehrlich, Sunrise, Fla.

[73] Assignee: A-1 Components Corporation, Hialeah, Fla.

[21] Appl. No.: 09/329,622

[22] Filed: Jun. 10, 1999

[51] Int. Cl.[7] .................................................... F16K 37/00
[52] U.S. Cl. ........................ 137/559; 137/550; 137/528; 73/323; 285/93
[58] Field of Search ...................... 137/559, 528, 137/544, 550; 73/323, 332, 325; 285/93

[56] References Cited

U.S. PATENT DOCUMENTS

| | | |
|---|---|---|
| 2,867,213 | 1/1959 | Thomas, Jr. . |
| 3,131,716 | 5/1964 | Griswold et al. . |
| 3,286,838 | 11/1966 | Jones . |
| 3,434,597 | 3/1969 | Balogh et al. . |
| 3,857,277 | 12/1974 | Moore . |
| 4,474,209 | 10/1984 | Akhtarekhavari . |
| 5,176,173 | 1/1993 | McGarrah ............................. 137/559 |
| 5,383,338 | 1/1995 | Bowsky et al. ....................... 73/323 X |
| 5,579,803 | 12/1996 | Welker ............................... 137/559 X |
| 5,763,776 | 6/1998 | Birch et al. . |

Primary Examiner—Kevin Lee
Attorney, Agent, or Firm—Baker & Daniels

[57] ABSTRACT

A sight glass filter and check valve apparatus for use in a fluid line. The apparatus includes a housing, first and second couplers connected to the housing, a sight glass assembly, a filter assembly, and a check valve assembly. The housing includes a pair of coordinated apertures. Each of the couplers includes a first end and a second end with the first ends threadedly received by the housing and the second ends connected to the fluid line. The sight glass assembly is disposed within the housing in alignment with the apertures. The filter assembly is disposed between the housing and the first coupler. The check valve assembly is disposed between the housing and the second coupler.

19 Claims, 4 Drawing Sheets

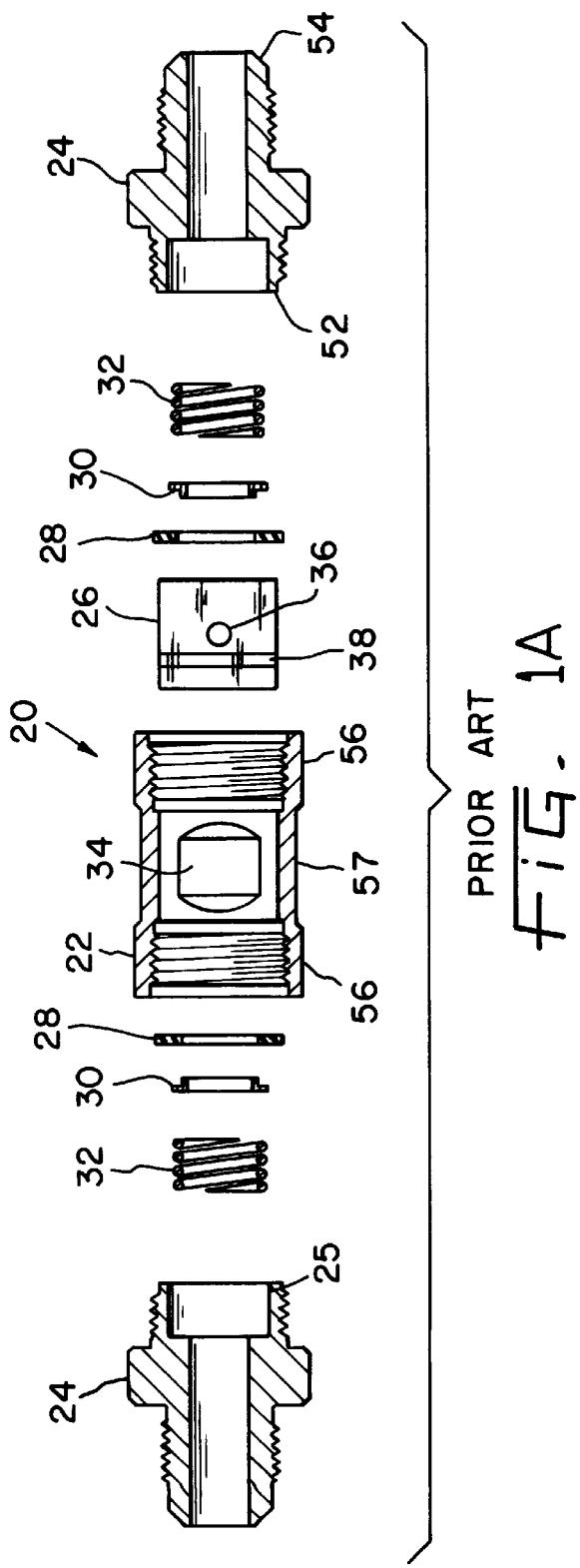
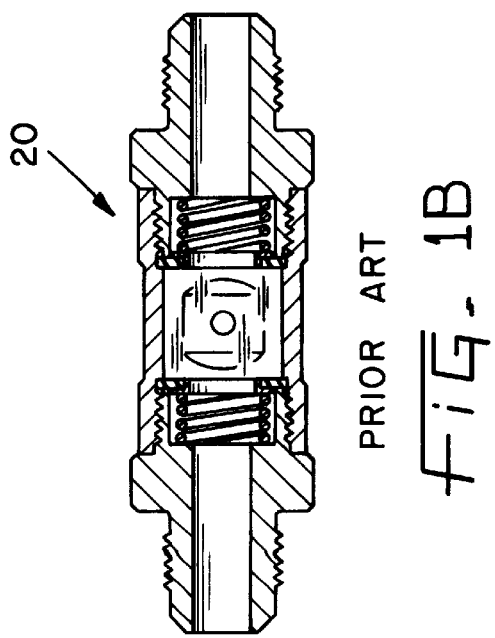
FIG. 1A PRIOR ART
FIG. 1B PRIOR ART

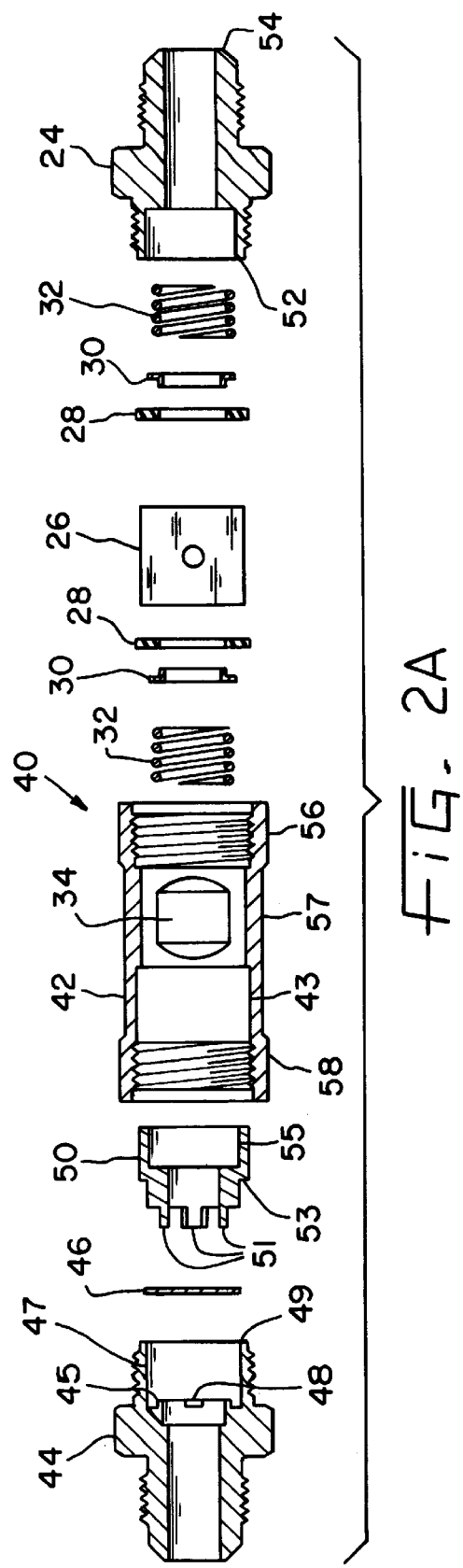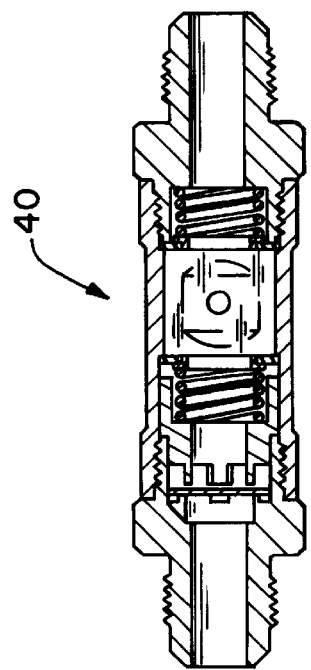

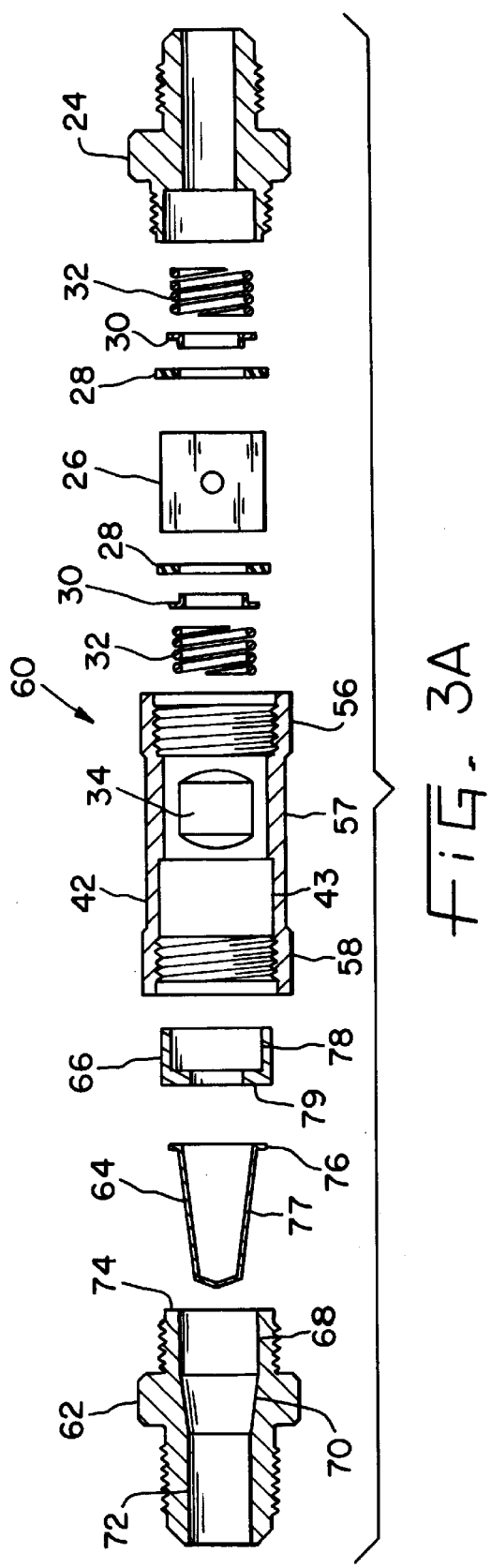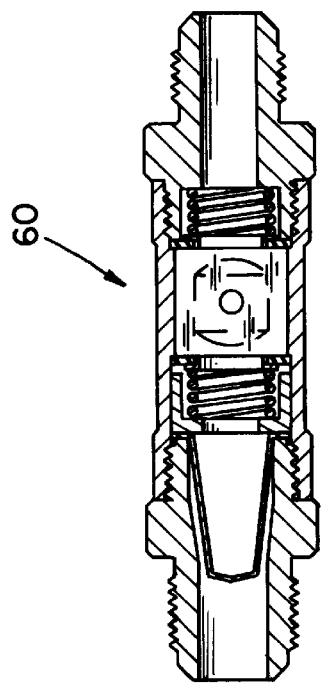

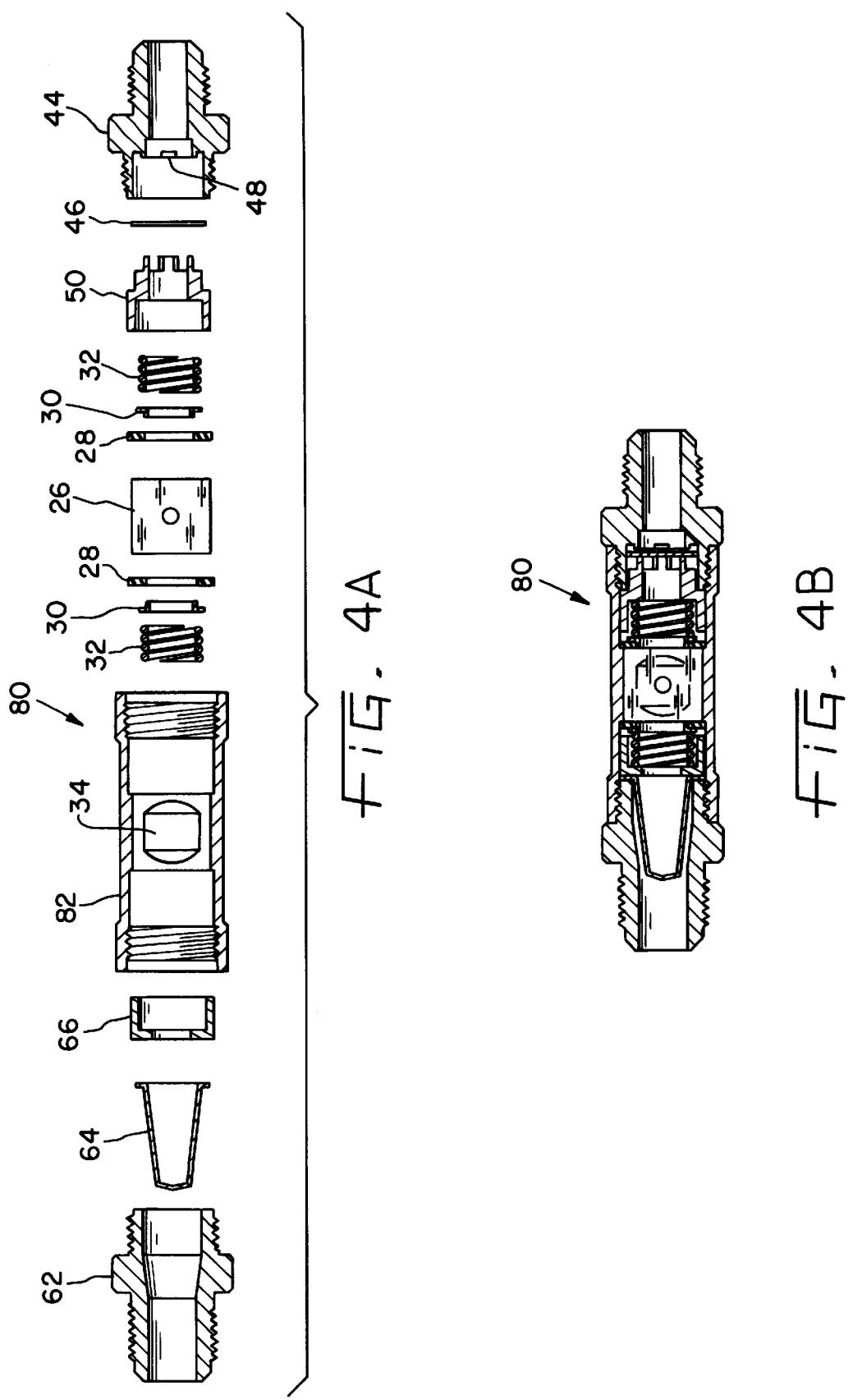

SIGHT GLASS WITH CHECK VALVE AND FILTER

BACKGROUND OF THE INVENTION

This invention relates in general to sight glass devices to allow viewing of fluid in a line and deals with more particularly to sight glass devices in combination with filters and/or check valves. The general aim of the present invention is to provide a sight glass with the additional features of a filter or a check valve or both while retaining the basic configuration and structure of the original sight glass with few added parts and only a slight extension of the assembly.

SUMMARY OF THE INVENTION

The present invention provides for the addition of features in a fluid line where once only a sight glass existed. In one embodiment a check valve is added to the sight glass assembly. In another embodiment a filter is added to the sight glass assembly. In a third embodiment both a check valve and filter are added to the sight glass assembly.

One advantage of the present invention is that it can replace two or three other devices. The present invention can replace a sight glass and a filter, a sight glass and a check valve, or a sight glass, a filter and a check valve.

Another advantage of the present invention is that very few parts are added to the sight glass to obtain the additional features than would be added by separate filters or check valves. Fewer additional parts help keep the cost down. Further, less connections will have to be made than would be the case if individual prior art components were installed in a refrigeration circuit.

Still another advantage of the present invention is that installation labor is lower. Only one device requiring two connections is installed instead of two or three devices with four or six connections.

Yet another advantage of the present invention is that in applications with restricted space, the addition of a filter or check valve adds only approximately 0.5 inches and the addition of both a check valve and a filter adds only approximately 1 inch. This is significantly less than would be added by separate filters or check valves.

Inventive aspects of the present invention include the use of check valve and filter supports along with the extension of the housing to add a filter and/or a check valve to the sight glass assembly. The supports perform two functions, one of which relates to their filter or check valve functions. The other function is to emulate the cavity of the coupler which now houses a filter or check valve.

The present invention provides a sight glass, filter and check valve apparatus comprising a housing, a first and second coupler connected to the housing for connecting to a fluid line, a sight glass assembly, a filter assembly, and a check valve assembly. The housing includes a pair of coordinated apertures. The apertures are aligned on opposite sides of the housing center to allow viewing through the housing. Couplers include a first and second end with the first end threadedly received by the housing and the second end connected to the fluid line. The sight glass assembly is installed within the housing in cooperation with the aperture. The filter assembly is installed between the housing and the first coupler. The check valve assembly is installed between the housing and the second coupler.

The present invention also provides a sight glass and filter apparatus comprising a housing, first and second couplers connected to said housing for attaching to a fluid line, a sight glass assembly, and a filter assembly. The housing includes a pair of coordinated apertures. The apertures are aligned on opposite sides of the housing center to allow viewing through the housing. The couplers include a first and second end with the first end threadedly received by the housing and the second end connected to the fluid lines. The sight glass assembly is installed within the housing in cooperation with the apertures and includes a glass tube, a pair of gaskets, and a compression device to urge the gaskets to the glass tube forming a seal between the glass tube and the housing. The filter assembly is installed between the housing and the first coupler and includes a filter and a filter support coupling the filter with the first coupler.

The present invention also provides a sight glass and check valve apparatus comprising a housing, a first and second coupler connected to the housing for attaching to a fluid line, a sight glass assembly, and a check valve assembly. The housing includes a pair of coordinated apertures. The apertures are aligned on opposite sides of the housing center to allow viewing through the housing. The coupler includes a first and second end with the first end threadedly received by the housing and the second end connected to the fluid line. The sight glass assembly is installed within the housing in cooperation with the apertures and includes a glass tube, a pair of gaskets, and a compression device to urge the gaskets to the glass tube forming a seal between the glass tube and the housing. The check valve assembly is installed between the housing and the second coupler and includes a steel disk, a check valve support, and a magnet imbedded into the second coupler.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIG. 1A is an exploded view of a prior art sight glass.

FIG. 1B is a sectional side view of the sight glass of FIG. 1A.

FIG. 2A is an exploded view of a sight glass and check valve combination.

FIG. 2B is a sectional side view of the sight glass and check valve combination of FIG. 2A.

FIG. 3A is an exploded view of a sight glass and filter combination.

FIG. 3B is a sectional side view of the sight glass and filter combination of FIG. 3A.

FIG. 4A is an exploded view of a sight glass, check valve, and filter combination.

FIG. 4B is a sectional side view of the sight glass, check valve, and filter combination of FIG. 4A.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates embodiments of the invention, in several forms, and such exemplifications are not to be construed as limiting the scope of the invention in any manner.

DETAILED DESCRIPTION OF THE PRESENT INVENTION

The embodiments disclosed below are not intended to be exhaustive or limit the invention to the precise forms disclosed in the following detailed description. Rather, the embodiments are chosen and described so that others skilled in the art may utilize their teachings.

FIGS. 1A and 1B show views of the prior art sight glass assembly. Sight glass assembly 20 comprises sight glass housing 22, a pair of sight glass couplers 24, glass tube 26 with dot 36, a pair of gaskets 28, a pair of spring pads 30, and a pair of springs 32. Housing 22 includes a pair of sight glass coupler ends 56, center portion 57, and a pair of coordinated apertures 34 in center portion 57. Apertures 34 are aligned on opposite sides of center portion 57 to allow viewing through housing 22. Glass tube 26 is placed into housing 22 and located in center portion 57 in cooperation with apertures 34. Gaskets 28, spring pads 30, and springs 32 are then installed into housing 22 on both sides of glass tube 26. Sight glass couplers 24 are then threadedly received into end 56 of housing 22. Springs 32 disposed in sight glass cavities 25 urge spring pads 30 and gaskets 28 to glass tube 26 to form a seal between glass tube 26 and housing 22.

Sight glass assembly 20 is installed in a fluid line in a position that is accessible for viewing and with dot 36 on the side opposite the viewing side of sight glass assembly 20. When there is fluid in the sight glass the dot will appear magnified and elongated. To provide an indication of fluid or the presence of moisture, moisture indicator 38 can be installed in glass tube 26.

FIGS. 2A and 2B show views of an embodiment of the inventive sight glass and check valve assembly. Sight glass and check valve assembly 40 includes check valve or filter housing 42, sight glass coupler 24, check valve coupler 44, glass tube 26, a pair of gaskets 28, a pair of spring pads 30, a pair of springs 32, steel disk 46, magnet 48, and check valve support 50.

Housing 42 includes sight glass coupler end 56, check valve or filter coupler end 58, center portion 57 and a pair of coordinated apertures 34 in center portion 57. Check valve or filter coupler end 58 is approximately 0.5 inches longer than sight glass coupler end 56.

Check valve coupler 44 includes raised lip 45, check valve coupler cavity 47 and check valve coupler rim 49. Magnet 48 is imbedded in check valve coupler 44.

Check valve support 50 includes fingers 51, check valve support shoulder 53, and check valve support cavity 55. Check valve support cavity 55 along with housing end 58 emulate sight glass coupler cavity 25 for spring 32.

Sight glass and check valve assembly 42 is assembled in a similar manner as sight glass assembly 20 using gaskets 28, spring pads 30, and springs 32 to form a seal between glass tube 26 and housing 42. Check valve support 50 is installed in housing 42 such that one of springs 32 is disposed in cavity 55. Steel disk 46 is placed against magnet 48 in check valve coupler 44. Check valve coupler 44 is then threadedly received into end 58 of housing 42. Check valve support shoulder 53 engages check valve coupler rim 49 such that a gap exists between steel disk 46 held by magnet 48 and fingers 51 of check valve support 50.

In operation, the sight glass function works as described above. The check valve function allows fluid to flow from check valve coupler 44 to housing 42, but checks the flow of fluid from housing 42 to check valve coupler 44. With no fluid present, magnet 48 urges steel disk 46 against raised lip 45, therefore fluid is checked from flowing from housing 42 out through check valve coupler 44. Fluid flowing from check valve coupler 44 to housing 42 will push steel disk 46 away from magnet 48 and into fingers 51 of check valve support 50. This will allow fluid to flow through check valve coupler 44 and into housing 42. When the fluid flow in that direction is stopped, magnet 48 will once again urge steel disk 46 against raised lip 45.

FIGS. 3A and 3B show views of an embodiment of the inventive sight glass and filter assembly. Sight glass and filter assembly 60 comprises check valves or filter housing 42, sight glass coupler 24, filter coupler 62, glass tube 26, a pair of gaskets 28, a pair of spring pads 30, a pair of springs 32, filter 64, and filter support 66.

Housing 42 includes sight glass coupler end 56, check valve or filter coupler end 58, center portion 57, and a pair of coordinated apertures 34 in center portion 57.

Filter coupler 52 includes filter coupler cavity 68, tapered portion 70, normal coupler passage 72, and filter coupler rim 74. Filter 64 includes filter shoulder 76 and filter body 77.

Filter support 66 includes filter support cavity 78 and filter support end 79. Filter support cavity 78 and housing cavity 43 emulate cavity 25 in sight glass coupler 24 for spring 32.

Sight glass and filter assembly 60 is assembled in a similar manner as sight glass assembly 20 using gaskets 28, spring pads 30, and springs 32 to form a seal between glass tube 26 and housing 42. Filter support 66 is installed into end 58 of housing 42 such that one of springs 32 is disposed in filter support cavity 78. Filter 64 is installed in filter coupler 62 such that body 77 extends through filter coupler cavity 78 and into tapered portion 70 and filter shoulder 76 rests against filter coupler rim 74. Coupler 62 is then threadedly received into end 58 of housing 42 such that filter support end 79 urges filter shoulder 76 into filter coupler rim 74.

In operation, the sight glass function will work as described above. The filter function will restrict the flow of foreign particles between filter coupler 62 and housing 42 in either direction. In a common situation with fluid flow from housing 42 to filter coupler 62, filter 64 will eliminate foreign particles from flowing out of filter coupler 62 and into a device, such as a compressor.

FIGS. 4A and 4B show views of an embodiment of the inventive sight glass, check valve, and filter assembly. Sight glass, check valve, and filter assembly 80 comprises check valve and filter housing 82, check valve coupler 44, sight glass coupler 62, glass tube 26, a pair of gaskets 28, a pair of spring pads 30, a pair of springs 32, steel disk 46, magnet 48, check valve support 50, filter 64, and filter support 66.

Check valve and filter housing 82 is approximately 1 inch longer than sight glass housing 22 to allow the addition of both a check valve and a filter. All of the remaining items are as described above.

Sight glass, check valve, and filter assembly 80 is assembled in a similar manner as sight glass 20 using gasket 28, spring pads 30, and springs 32 to form a seal between glass tube 26 and housing 82. In addition the filter and check valve are assembled as described above.

In operation, all the functions of the sight glass check valve and filter assembly 80 operate as described above except for the filter. The filter will only trap foreign particles in one direction since the check valve will only allow fluid flow from check valve coupler 44 through housing 82 and out filter coupler 62.

Each of the above assemblies have shown a pair of springs and spring pads to urge a seal between the glass tube and the housing, but a single spring and spring pad or other compression device may be used to aid the sealing of the glass tube to the housing.

All of the couplers shown have threaded male connectors for connecting to a fluid line, but threaded female connectors or connectors solderable to the line would work as well.

While this invention has been described as having exemplary designs, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A sight glass, filter and check valve apparatus for a fluid line, comprising:
    a housing having a pair of coordinated apertures;
    a first and second coupler connected to said housing, each of said couplers comprising a first and second end, each of said first ends threadedly received by said housing, each of said second ends connected to the fluid line;
    a sight glass disposed within said housing in alignment with said apertures;
    a filter disposed between said housing and said first coupler; and
    a check valve disposed between said housing and said second coupler.

2. The apparatus of claim 1, wherein said sight glass comprises a glass tube, a pair of gaskets, and a compression device to urge said gaskets to said glass tube forming a seal between said glass tube and said housing.

3. The apparatus of claim 2, wherein said compression device comprises a spring and a spring pad.

4. The apparatus of claim 1, wherein said filter comprises a filter and a filter support coupling said filter with said first coupler.

5. The apparatus of claim 1, wherein said check valve comprises a steel disk, a check valve support, and a magnet embedded into said second coupler.

6. The apparatus of claim 1, wherein said sight glass comprises a moisture indicator.

7. The apparatus of claim 1, wherein said second ends of said couplers are threaded female connectors.

8. The apparatus of claim 1, wherein said second ends of said couplers are threaded male connectors.

9. The apparatus of claim 1, wherein one of said second ends of said couplers is a threaded female connector and other of said second ends of said couplers is a threaded male connector.

10. The apparatus of claim 1, wherein said second end of said coupler is solderable to the line.

11. A sight glass, filter and check valve apparatus for a fluid line, comprising:
    a housing comprising a pair of coordinated apertures;
    a first and second coupler connected to said housing, each of said couplers comprising a first and second end, each of said first ends threadedly received by said housing, each of said second ends connected to the fluid line;
    a sight glass disposed within said housing in alignment with said apertures, said sight glass comprising a glass tube, a pair of gaskets, and a compression device to urge said gaskets to said glass tube forming a seal between said glass tube and said housing;
    a filter disposed between said housing and said first coupler, said filter comprising a filter and a filter support coupling said filter with said first coupler; and
    a check valve disposed between said housing and said second coupler, said check valve comprising a steel disk, a check valve support, and a magnet embedded into said second coupler.

12. The apparatus of claim 11, wherein said sight glass comprises a moisture indicator.

13. The apparatus of claim 11, wherein said compression device comprises a spring and a spring pad.

14. A sight glass and filter apparatus for a fluid line, comprising:
    a housing comprising a pair of coordinated apertures;
    a first and second coupler connected to said housing, each of said couplers comprising a first and second end, each of said first ends threadedly received by said housing, each of said second ends connected to the fluid line;
    a sight glass disposed within said housing in alignment with said apertures, said sight glass assembly includes a glass tube, a pair of gaskets, and a compression device to urge said gaskets to said glass tube forming a seal between said glass tube and said housing; and
    a filter disposed between said housing and said first coupler, said filter comprising a filter and a filter support coupling said filter with said first coupler.

15. The apparatus of claim 14, wherein said sight glass comprises a moisture indicator.

16. The apparatus of claim 14, wherein said compression device comprises a spring and a spring pad.

17. A sight glass and check valve apparatus for a fluid line, comprising:
    a housing comprising a pair of coordinated apertures;
    a first and second coupler connected to said housing, each of said couplers including a first and second end, each of said first ends threadedly received by said housing, each of said second ends connected to the fluid line;
    a sight glass disposed within said housing in alignment with said apertures, said sight glass comprising a glass tube, a pair of gaskets, and a compression device to urge said gaskets to said glass tube forming a seal between said glass tube and said housing; and
    a check valve disposed between said housing and said second coupler, said check valve comprising a steel disk, a check valve support, and a magnet embedded into said second coupler.

18. The apparatus of claim 17, wherein said sight glass comprises a moisture indicator.

19. The apparatus of claim 17, wherein said compression device comprises a spring and a spring pad.

* * * * *